Patented Feb. 27, 1923.

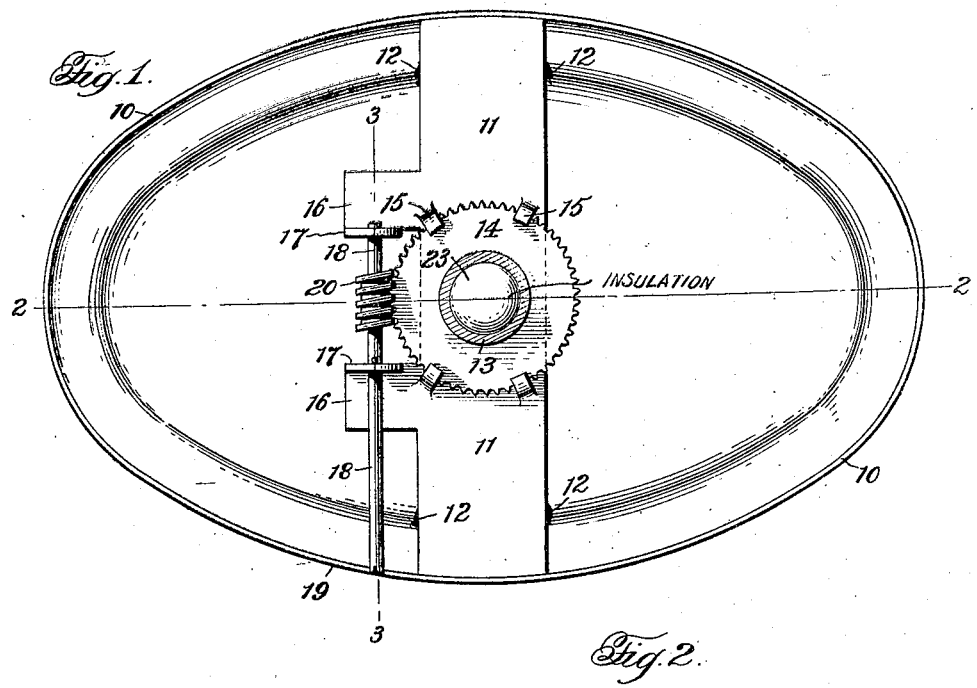
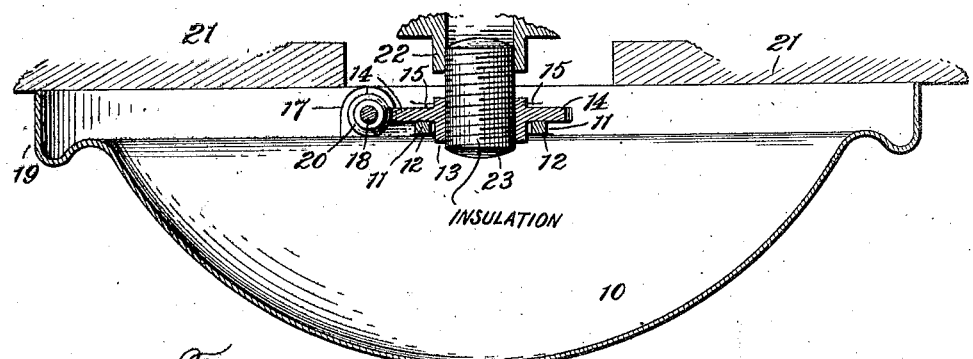
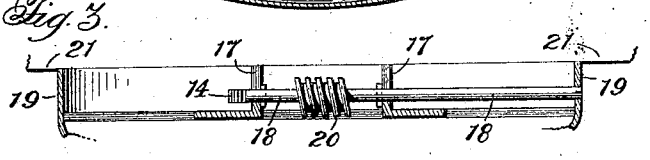

1,446,788

UNITED STATES PATENT OFFICE.

JOHN A. DAUM, OF PITTSBURGH, PENNSYLVANIA.

CANOPY OR FIXTURE SECURING DEVICE.

Application filed January 19, 1921. Serial No. 438,374.

*To all whom it may concern:*

Be it known that I, JOHN A. DAUM, a citizen of the United States, residing at Pittsburgh, in the county of Allegheny and State of Pennsylvania, have invented new and useful Improvements in Canopy or Fixture Securing Devices, of which the following is a specification.

My invention pertains to devices for securing articles to walls, ceilings or the like, and relates particularly to devices for securing canopies, brackets or other fixtures in place, especially ornamental canopies, brackets and fixtures for supporting electric lamp sockets and the like.

In securing, for instance, in position those ornamental canopies and brackets which are commonly employed as a support for electric wall fixtures, difficulty has been experienced in obtaining a sufficiently firm connection with the wall, and it has been a frequent trouble that the canopy has been liable to shift when being dusted or cleaned, thus getting out of the correct position and often leaving an unsightly mark at the position it originally occupied. Where attempts have been made to avoid this difficulty and trouble, they have usually entailed a lessening of the ornamental qualities of the canopy. It is an object of my invention to produce a securing device for canopies wall brackets, and articles of a kindred nature, which will be capable of holding the canopy firmly in position, so as to withstand efficiently any strains to which it would be subjected in the course of ordinary use. It is another object of my invention to provide a securing device which may be operated from the outside of the canopy, or other article, and which will not in any way mar its appearance. It is a further object of my invention to provide a securing device which will be of a simple and economical nature, and easy to fix in place and to operate. And other and further objects will appear from the following specification, taken in connection with the appended claims.

By way of example, I have described in the following specification, and shown in the accompanying drawing, one form of canopy securing device in which my invention may be embodied. I particularly wish it understood, however, that the invention may be embodied in other forms, and that changes may be made in the form described and shown, without exceeding the scope thereof, as defined in the appended claims.

In the drawing:

Fig. 1 is an inverted plan of a canopy provided with a securing device constructed in accordance with my invention;

Fig. 2 is a section on the line 2—2 of Fig. 1, and showing the canopy secured in place on a wall; and Fig. 3 is an enlarged section taken on the line 3—3 of Fig. 1, looking in the direction of the arrows.

Like reference characters refer to like parts throughout the following specification and the several figures of the accompanying drawing.

Referring now to the drawing, 10 designates a canopy of a medallion shape, such as is frequently employed as an ornamental base for an electric wall fixture. The electric fixture itself is not shown as this may extend from the canopy, and receive the conductors, in various ways which are well known in the art.

In carrying my invention into effect in connection with such a canopy as is here shown, I provide a support taking the form of a cross-plate 11, which extends across the inside of the bracket, and is rigidly secured therein by means of solder 12. The cross-plate 11 is formed with a central hole for rotatably receiving an internally screw-threaded sleeve 13 which forms the center of a worm-wheel 14. The worm-wheel 14 is held against removal from the hole in the cross plate 11 by means of ears 15 which are stamped out from the metal of the cross-plate and bent down so as to secure the worm-wheel 14 between them and the body of the cross-plate.

The cross-plate 11 is formed with outwardly extending lugs 16 having upwardly-bent ears 17 which provide bearings for a worm-spindle 18, which extends outwardly through a suitable small aperture in one of the vertical side walls 19 of the bracket 10, and is formed at its end with a slot for receiving a screw-driver or the like. The worm spindle 18 carries a worm 20 which cooperates with the worm-wheel 14; so that by rotating the spindle 18 the wheel 14 is likewise caused to rotate.

Such a canopy as is here shown is usually connected to the wall 21 at a place where an outlet box is provided, the outlet box being usually provided with an outwardly-extending bushing 22. I provide the sleeve 13 with a plug 23, formed of hard fibre or other insulating composition, which is secured thereinto and also into the bushing 22 carried in the wall. It will be seen that by revolving the sleeve 13, by the action of the worm 20 on the wheel 14, the canopy 10 can be firmly drawn up against the wall 21. By revolving the sleeve in the opposite direction the canopy is readily removed.

By the securing device of my invention, which is exceptionally simple and economical of manufacture, it is possible to draw the canopy, or other article, firmly up against the wall and secure it immovably thereon. It is easy to operate, and further, has the special advantage that, being entirely hidden, except for the small visible end of the worm-spindle 18 (which may be made to point in any direction), it does not mar the appearance of the canopy.

Having thus fully described my invention, what I claim as new, and desire to secure by Letters Patent is:

1. The combination with a fixture of the character set forth, of a support mounted therein, a securing member rotatably mounted in said support, and an actuating member geared to said securing member and extending laterally with respect to the axis thereof.

2. The combination with a fixture of the character set forth, of a support plate extending transversely across the inside thereof and secured thereto, a securing member rotatably mounted in said plate, and an actuating member geared to said securing member and extending laterally with respect to the axis thereof.

3. The combination with a fixture of the character set forth, of a support secured therein, a screw-threaded member rotatably mounted in said support for cooperation with a corresponding wall member, and an actuating member for said threaded member, said actuating member being rotatably mounted in said support so as to extend laterally with respect to the axis of said threaded member.

4. The combination with a fixture of the character set forth, of a support secured therein, a screw-threaded sleeve rotatably mounted in said support for cooperation with a corresponding wall member, and an actuating member geared to said sleeve and extending laterally with respect to the axis thereof.

5. The combination with a fixture of the character set forth, of a support plate extending transversely across the inside thereof and secured thereto, a screw-threaded sleeve rotatably mounted in said support plate, an insulating plug threaded into said sleeve for cooperation with a corresponding wall member, and an actuating member geared to said sleeve and extending laterally with respect to the axis thereof.

6. The combination with a fixture of the character set forth, of a support plate extending transversely across the inside thereof and secured thereto, a worm wheel rotatably mounted in said plate and having a central internally screw-threaded sleeve, and a worm spindle cooperating with said worm wheel.

7. The combination with a fixture of the character set forth, of a support plate extending transversely across the inside thereof and secured thereto, a worm wheel rotatably mounted in said plate and having a central internally screw-threaded sleeve, a worm spindle cooperating with said worm wheel, and means for supporting said spindle with its end accessible from outside said bracket.

8. The combination with a fixture of the character set forth, of a support plate extending transversely across the inside thereof and secured thereto, a worm wheel rotatably mounted in said plate and having a central internally screw-threaded sleeve, an insulating plug threaded into said sleeve for cooperation with a corresponding wall member, a worm spindle cooperating with said worm wheel, and means for supporting said spindle with its end accessible from outside said bracket.

JOHN A. DAUM.

Witnesses:
HELEN E. SHAW,
R. M. EVANS.